United States Patent

[11] 3,542,403

| [72] | Inventor | Robert R. Douglas |
| | | Philadelphia, Pennsylvania |
| [21] | Appl. No. | 824,070 |
| [22] | Filed | May 13, 1969 |
| [45] | Patented | Nov. 24, 1970 |
| [73] | Assignee | The Singer Company |
| | | a corporation of New Jersey |

[54] CONNECTION ASSEMBLY FOR GAS METERS
3 Claims, 4 Drawing Figs.

[52] U.S. Cl. ............................................. 285/30, 285/132
[51] Int. Cl. ............................................. F16l 35/00
[50] Field of Search .................................... 285/30, 130, 131, 132, 61, 64; 248/61

[56] References Cited
UNITED STATES PATENTS

| 1,590,733 | 6/1926 | Burnett | 248/65X |
| 1,752,631 | 4/1930 | Campbell | 285/61X |
| 2,881,012 | 4/1959 | Rings | 285/30 |
| 2,958,547 | 11/1960 | Batts et al. | 285/131X |

FOREIGN PATENTS

| 780,678 | 8/1957 | Great Britain | 285/30 |

Primary Examiner—Dave W. Arola
Attorneys—Marshall J. Breen, Chester A. Williams, Jr. and Harold Weinstein ABSTRACT: This disclosure relates to a connection assembly for meters, such as gas meters, having a supply main and discharge main in axial alignment with each other so as to permit the separate interconnection of the supply main to the gas meter and the gas meter to the discharge main.

Patented Nov. 24, 1970

3,542,403

INVENTOR.
Robert R. Douglas
BY Harold Weinstein
ATTORNEY

WITNESS:
Marvin Rothenberg

CONNECTION ASSEMBLY FOR GAS METERS

BACKGROUND OF THE INVENTION

Heretofore in the meter art, especially gas meters, it has been common practice to make a top connection to the meter inlet and outlet through two vertically spaced parallel pipes by means of swivels and ring nuts. However, the spacing must be exact in order to avoid damage to the meter. Of necessity, a meter bar or a strengthened housing has been required to avoid either damage to the meter or excessive pipe strain. One attempt in avoiding these problems has been made through the use of a coaxial meter connection, and while this may provide some advantages it also introduces new problems to be overcome, such as bypass leakage, and still requiring the use of a ring nut type connection at the meter.

SUMMARY OF THE INVENTION

In accordance with the present invention, the novel connection assembly is used preferably in a gas delivery system which supplies a metered quantity of gas entering through a supply main for delivery to the housing of a gas meter wherein it passes to the gas measuring device of said meter for delivery to the discharge main. The supply main and the discharge main are in axial alignment. The connection assembly includes a tubular casing which interconnects the supply main to the gas meter and the gas meter to the discharge main. The tubular casing has axially aligned openings at either end thereof for connection to the supply main and the discharge main, respectively. A transverse partition wall is disposed intermediate the ends of the tubular casing to divide the interior thereof into a supply portion and a discharge portion. A supply port is formed in the supply portion casing adjacent the partition wall to communicate the supply main to the meter housing. A delivery port is formed in the delivery portion of the casing adjacent the partition wall to place the gas measuring device of the gas meter in communication with the discharge main. The supply port and the delivery port open into a common plane. Means operatively connect the tubular casing to the gas meter simultaneously to seal the supply port to the meter housing and the delivery port to the gas measuring device.

It is therefore an object of the present invention to provide an improved connection assembly for meters, such as gas meters, which overcomes the prior art disadvantages; which is simple; economical and reliable; which is so designed as to positively prevent bypass leakage; which has vertically aligned openings for connection to the supply main and the discharge main; which is connectible to the gas meter along a common plane; which is self-supporting; which permits independent attachment and removal of the gas meter; which includes a casing that may easily be formed by diecasting; which connection assembly may be supported by a separate bracket remote from the meter connection; which may be connected to the gas meter by screws; which comes into face to face contact with the meter to permit simultaneously sealing engagement with the supply port and the delivery port to the gas meter; and which does not cause any strain at the connecting points of the gas meter with the supply and the discharge mains.

Other objects and advantages will be apparent from the following description of one embodiment of the invention and the novel features will be particularly pointed out hereinafter in the claims.

BRIEF DESCRIPTION OF THE DRAWINGS

This invention is illustrated in the accompanying drawings in which.

DESCRIPTION OF THE INVENTION

Figure 1:
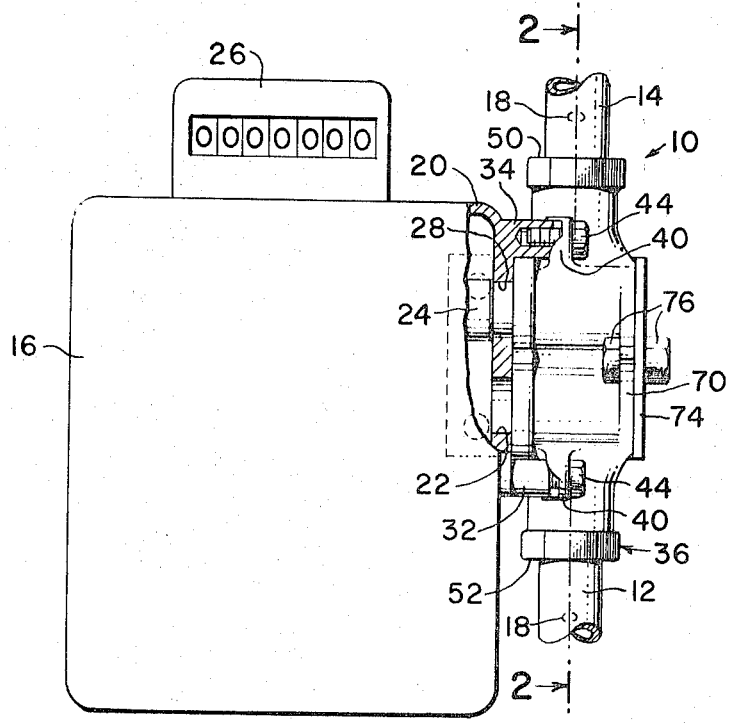
FIG. 1 is a front elevational view, partly in section, of the novel connection assembly of the present invention.

In the embodiment of the invention illustrated in FIG. 1 the connection assembly, designated generally 10, separately connects a supply main 12 and a discharge main 14 to a suitable meter, such as gas meter 16. The supply main 12 and the discharge main 14 are disposed along a common axis 18 at their respective connections to the connection assembly 10

The gas meter 16 includes a housing 20 into which gas is introduced through inlet 22 for delivery to a gas measuring device, (not shown) having an exit tube 24 for discharge of the gas subsequent to the quantity being measured in said device and recorded by the register 26 in a manner well known in the art. For purposes of the present invention the exit tube 24 is affixed in an opening 28 of the housing 20 adjacent to the opening 22 and terminating in a common plane therewith. The openings 22 and 28 are formed in a vertical wall of the housing 20, but if desired could be formed at any other convenient location so as to be compatible with the connection assembly 10. Each of the openings 22 and 28 illustrated in FIG. 4 has an annular lip 30 formed on the exterior wall of the housing. Bosses 32 and 34 shown in FIGS. 1, 3 and 4 are formed below and above the respective openings 22 and 28.

Figure 2:
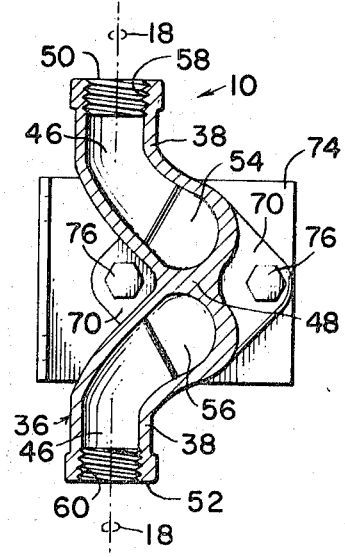
FIG. 2 is a cross-sectional view taken along line 2-2 of FIG. 1.
Figure 3:
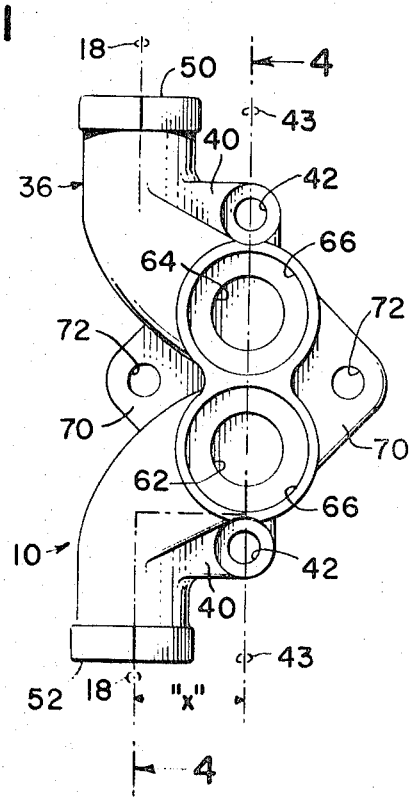
FIG. 3 is a side elevational view of the casing, per se, of the connection assembly of the present invention.
Figure 4:
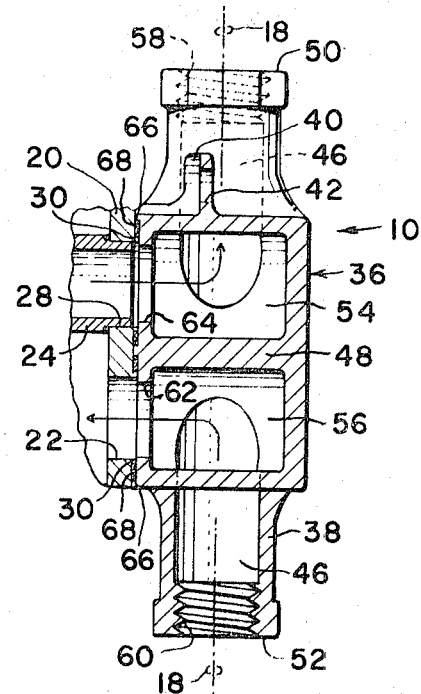
FIG. 4 is a sectional view of the line 4-4 of FIG. 3 showing the two separate connections through the supply port and the discharge port of the casing to the gas meter, with the meter components also in section.

The connection assembly 10 includes a casing 36, illustrated in FIGS. 2, 3 and 4 and having a generally tubular configuration defined by wall means 38. A pair of casing bosses 40 having holes 42 therein are formed a predetermined distance from each other along a hypothetical straight line 43 best seen in FIG. 3 to correspond to the exact space between the meter bosses 32 and 34 respectively to connect the casing 36 to the gas meter 16 as shown in FIG. 1.

The tubular casing 36 as illustrated in FIGS. 2 and 4 has a passage 46 through which a transverse partition wall 48 extends intermediate the ends 50 and 52 thereof to form a discharge portion 54 and a supply portion 56, respectively. The ends 50 and 52 have threaded openings 58 and 60 which are formed in axial alignment with each other, so that in connected position shown in FIG. 1 their respective axis will correspond to the axis 18 of the supply main 12 and the discharge main 14. Since the axis of openings 58 and 60 is coincident with axis 18 in assembled position, it will be designated by the same reference character 18.

Though the passage 46 may be straight, in the preferred embodiment it is shown serpentine to facilitate the gas flow into and out of the gas meter 15 at minimum static head loss. FIGS. 3 and 4 show a supply port 62 formed on the supply side of the partition wall 48 and a delivery port 64 formed on the discharge side of the partition wall 48. The supply port 62 and the delivery port 64 define meter openings in the casing 36 which terminate in a common plane, and have their centers each lying along the hypothetical line 43. In assembled position the hypothetical line 43 will lie parallel to the axis 18 and offset therefrom by a predetermined distance "X", though of course if desired it could be coincidental therewith. The diameter of the respective ports 62 and 64 is substantially the same size as the corresponding openings 22 and 28 of the housing 20. An annular recess 66 surrounds the ports 62 and 64 and extends inwardly from the common plane thereof a distance equal to the length of the lip 30. Annular gaskets 68 are disposed in the recesses 66 to seal the connection between the ports 62 and 64 and the respective openings 22 and 28 as shown in FIG. 4.

Prior to connecting the casing 36 with the gas meter 16, the casing 36 can be connected to the supply main 12 at the end 52, and to discharge main 14 at end 50 so as to place the openings 60 and 58, respectively, in the common axis 18 thereof. A pair of bracket bosses 70 each having a hole 72 therein are formed outwardly of the partition wall 48 on the exterior side of the casing 36. If independent support of the supply main 12 and the discharge main 14 is desired an L- bracket 74 may be connected by nut and bolt 76, with the bracket 74 suitably connected in turn to a supporting frame member (not shown).

Thereafter, and without interference with the mounting bracket 74 connection to the casing 36 the gas meter 16 may be connected to the casing 36 at the common plane of the ports 62 and 64. Upon tightening of the screws 44 in the threaded holes of the boss 34 on either side of the hypothetical line 43, the lips 30 will be placed in face to face contact within the recesses 66 whereby the gaskets 68 will be compressed therebetween to simultaneously form separately sealed connections between the respective ports 62 and 64 and openings 22 and 28. In this manner, the supply main 12 will be placed in communication with the opening 22 of the housing 20 so as to permit gas to pass from the supply opening 60 through the supply portion 56 of passage 46 and be discharged through supply port 62 into the housing 20 through the opening 22. Likewise, measured quantity of gas from the gas measuring device will exit from tube 24 through the opening 28 in the housing into the discharge port 64 for passage through the discharge portion 52 to the discharge opening 58 and into the discharge main 14 for subsequent use.

Accordingly, by use of the novel connection assembly 10 the desired objectives may be obtained. In the instance of new dwellings, the gas piping may be completed prior to connection of the gas meter 16, while in the instance of occupied dwellings, repair or replacement of existing gas meters 16 will be facilitated.

It will be understood that various changes in the details, materials, arrangement of parts and operating conditions which have been herein described and illustrated in order to explain the nature of the invention may be made by those skilled in the art within the principles and scope of the invention.

I claim:

1. In a connection assembly for a meter, the combination of:
   a. a casing having wall means, and two passage means formed in the wall means separately to extend through the casing;
   b. each of the passage means having an opening formed at either end of the respective passage means to extend through the wall means;
   c. one of the openings in each of the passage means formed along a substantially common axis to define axial opening at opposite ends of the casing;
   d. the other of the openings in each of the passage means formed at the end of the passage means remote from the axial opening and terminating in a common plane adjacent to each other to define a pair of meter openings;
   e. an annular recess formed in the wall means of the casing to separately surround each of the meter openings;
   f. gasket means separately disposed in each of the recesses between the casing and the gas meter to seal the connection therebetween;
   g. means operatively connecting the casing to the gas meter at the common plane of said meter openings;
   h. the connecting means defining a pair of connecters disposed on either side of the meter openings along a hypothetical straight line passing through the meter openings; and
   i. said connecters are formed in spaced relationship to each other along the hypothetical line which is parallel to the common axis of the axial openings.

2. In a gas delivery system for supplying a metered quantity of gas, a supply main, a gas meter having a housing and a gas measuring device therein, a discharge main in axial alignment with the supply main, a connecting means interconnecting the supply main to the gas meter and the gas meter to the discharge main, said connecting means comprising:
   a. a tubular casing having axially aligned openings at either end thereof, one of the openings connected to the supply main and the other opening connected to the discharge main;
   b. a transverse partition wall disposed across the interior of the tubular casing, intermediate the ends thereof, to divide the same into a supply portion and a discharge portion;
   c. a supply port formed adjacent the partition wall on the supply portion side thereof to place the meter housing in communication with the supply main to supply gas thereto;
   d. a delivery port formed adjacent the partition wall on the delivery portion side thereof to place the gas measuring device of the gas meter in communication with the discharge main to deliver measured quantities of gas thereto;
   e. the supply port and the delivery port formed in a common plane which is perpendicular to a plane passing through the axis of the supply and discharge mains;
   f. the supply port and the delivery port formed in an offset position from the common axis and having spaced centers defining a hypothetical straight line parallel to the common axis;
   g. a pair of bosses formed on the exterior of the tubular casing on either side of the spaced ports along the hypothetical line passing therethrough;
   h. each of the bosses having holes therein; and
   i. means operatively connecting the tubular casing to the gas meter, by passing through the holes of the bosses thereof, simultaneously to seal the supply port to the meter housing and the delivery port to the gas measuring device.

3. The supply main and the discharge main each having a vertically aligned axis and in combination with the gas supply system as claimed in claim 2 wherein:
   a. the common plane of the supply and discharge ports is vertically formed; and
   b. the supply port and the discharge port each connected to the gas meter along a vertical wall thereof.